Figure 8:
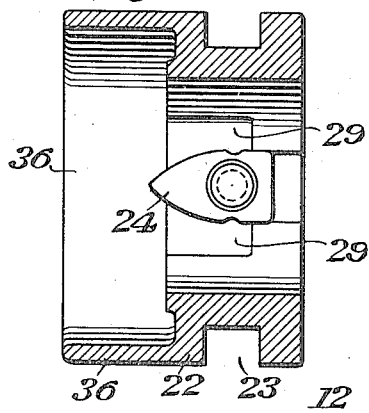

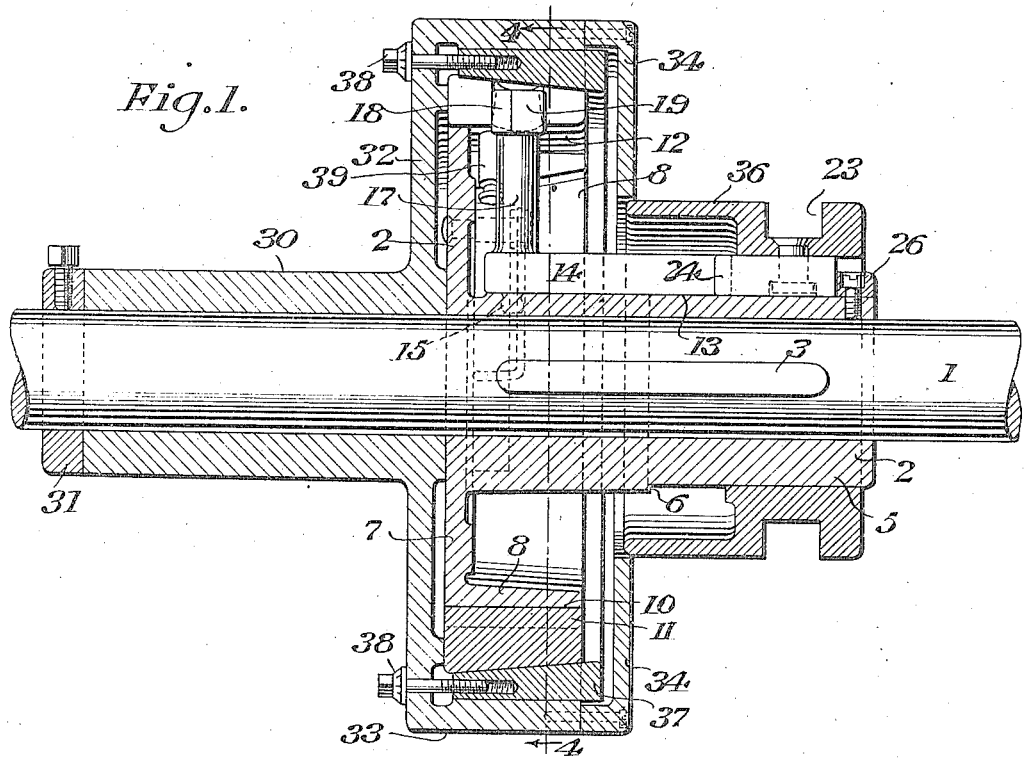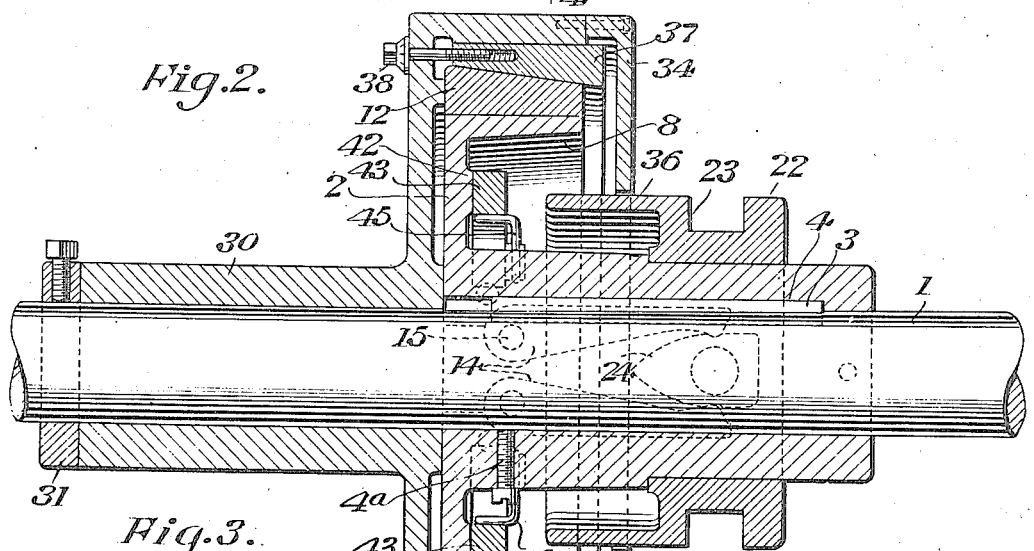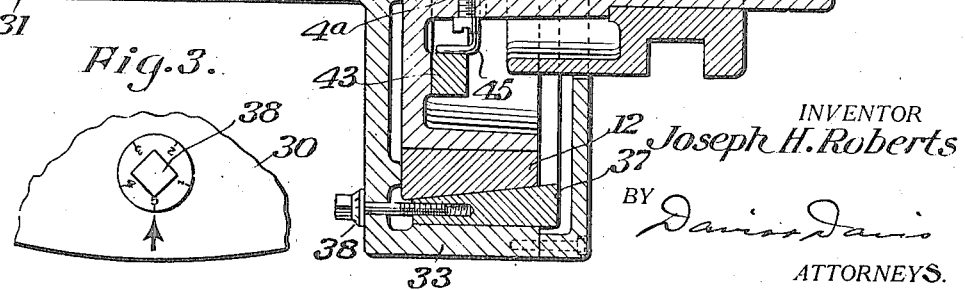

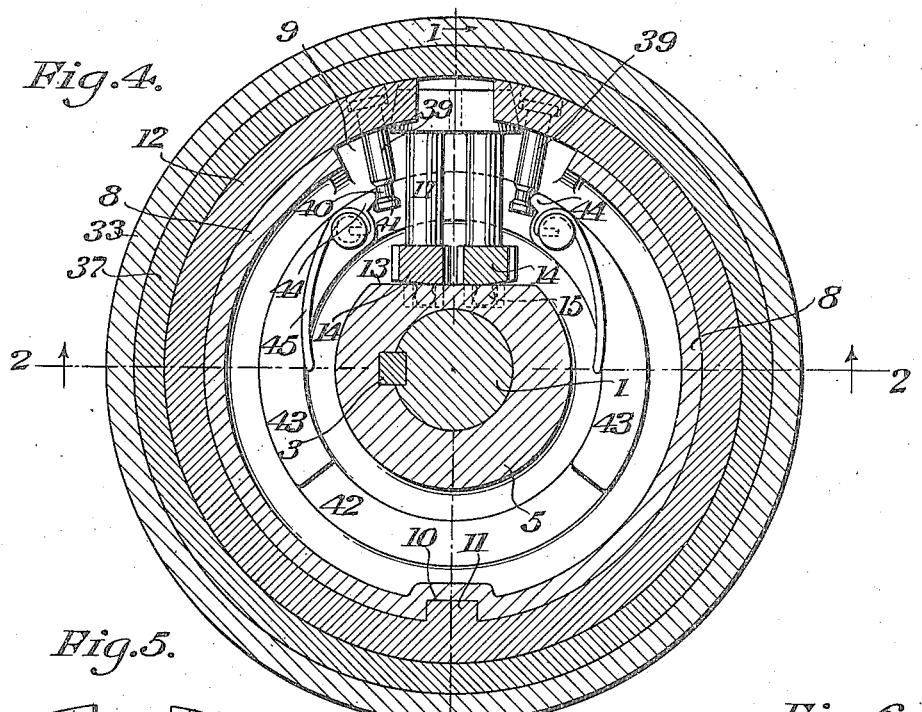
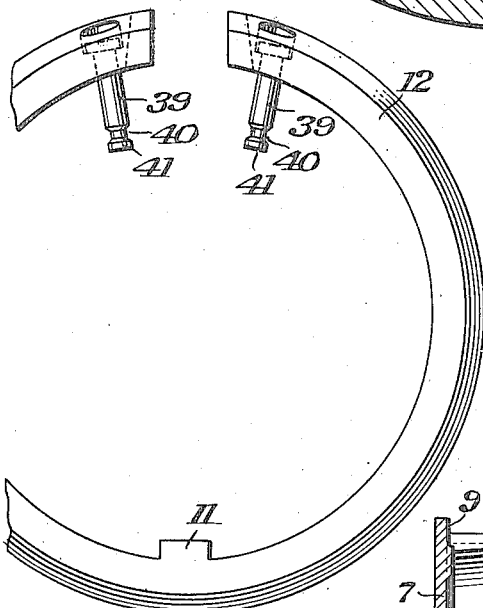
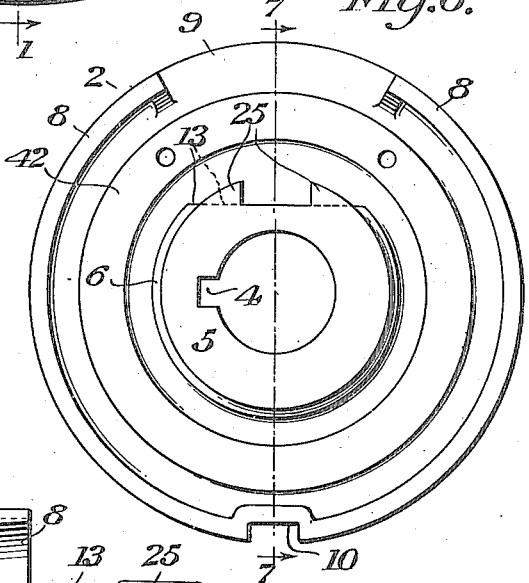
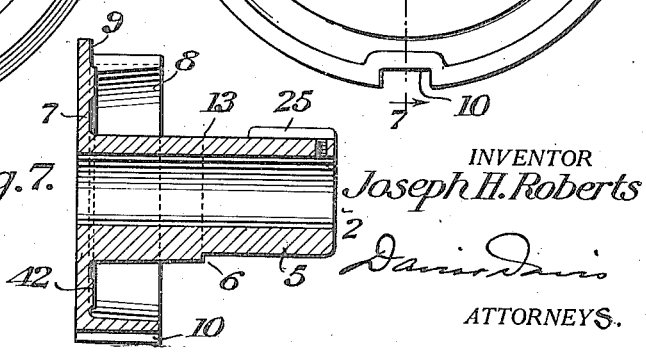

Oct. 14, 1924.

J. H. ROBERTS

FRICTION CLUTCH

Filed Feb. 8, 1923

1,511,776

4 Sheets-Sheet 3

INVENTOR
Joseph H. Roberts
BY
ATTORNEYS.

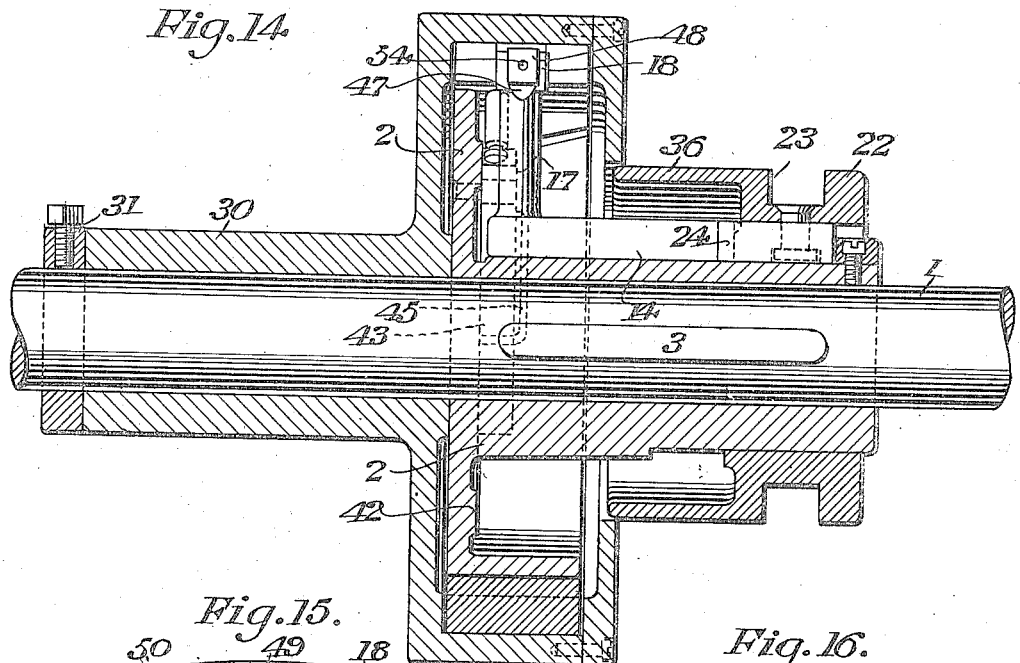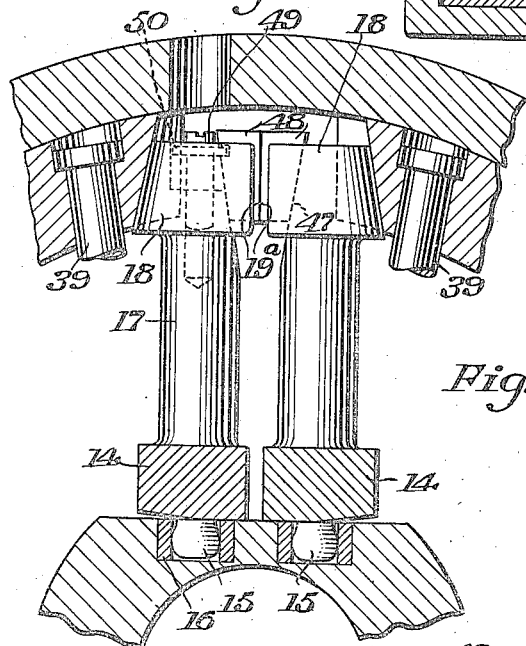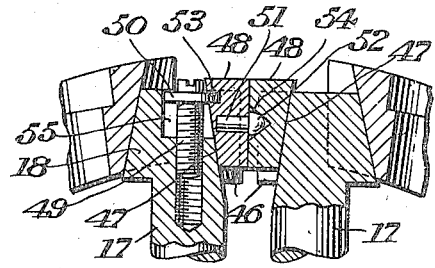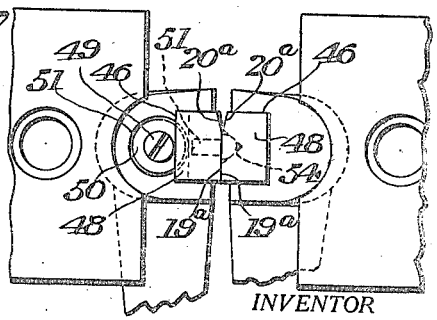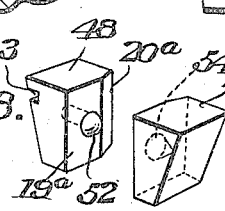

Patented Oct. 14, 1924.

1,511,776

UNITED STATES PATENT OFFICE.

JOSEPH H. ROBERTS, OF WATERBURY, CONNECTICUT.

FRICTION CLUTCH.

Application filed February 8, 1923. Serial No. 617,726.

*To all whom it may concern:*

Be it known that I, JOSEPH H. ROBERTS, a citizen of the United States, and resident of Waterbury, in the county of New Haven and State of Connecticut, have invented certain new and useful Improvements in Friction Clutches, of which the following is a specification.

The principal object of this invention is to provide a friction clutch of the expanding ring type in which the clutch ring may be of any desired diameter without enlarging the clutch body. The clutch body is of convenient size to fit the main drive shaft and carries a friction ring drum which may be of any suitable diameter. The expanding clutch ring is mounted on the drum and the expanding levers are mounted on the clutch body. The expanding cams engage the clutch ring and are connected to the expanding levers by posts which extend outwardly from the levers. The posts will be of different lengths for different sizes of clutch rings.

Another important object of the invention is to provide adjustable means for taking up wear on the clutch members.

Figure 9:
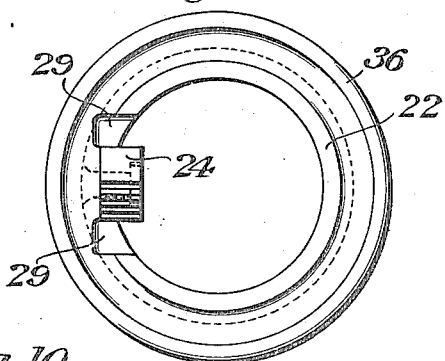
Figure 10:
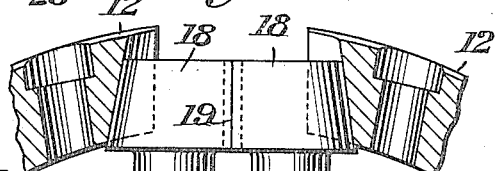
Figure 11:
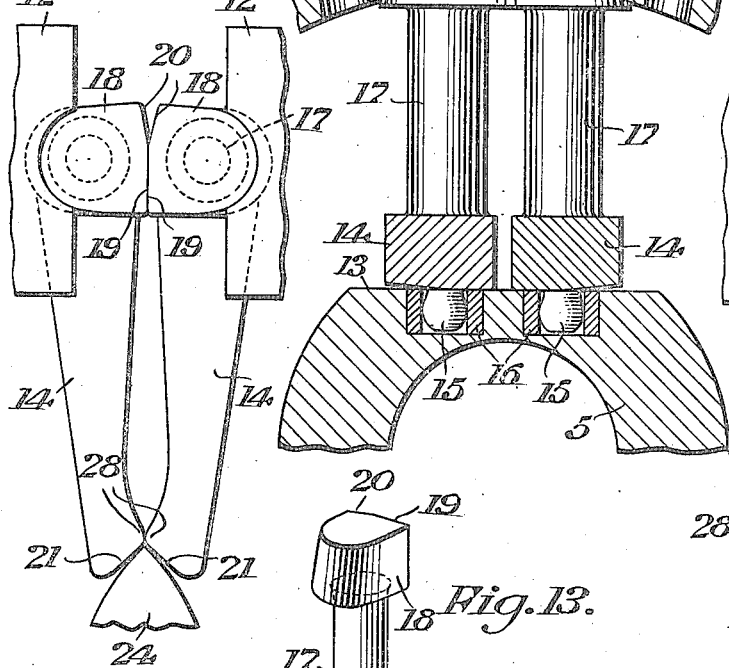
Figure 12:
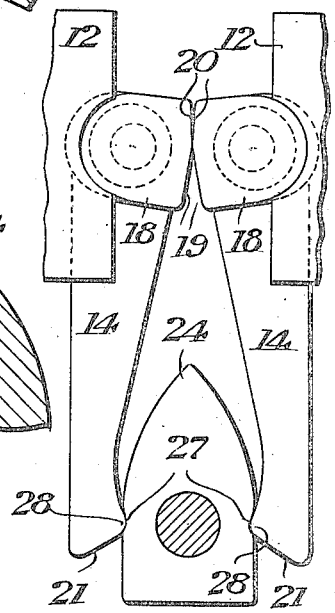
Figure 13:
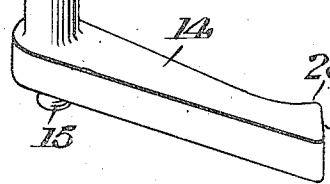

In the drawings, Fig. 1 is a longitudinal sectional view taken on the line 1—1 of Fig. 4;

Fig. 2 a longitudinal sectional view taken on the line 2—2 of Fig. 4;

Fig. 3 a detail view of the head of one of the screws for adjusting the wearing ring;

Fig. 4 a transverse sectional view taken on the line 4—4 of Fig. 1;

Fig. 5 a detail view of the clutch ring;

Fig. 6 an elevation of the clutch body;

Fig. 7 a longitudinal central sectional view of the clutch body taken on the line 7—7 of Fig. 6 and drawn on a reduced scale;

Fig. 8 a longitudinal sectional view of the shifter sleeve;

Fig. 9 an end elevation of the shifter sleeve;

Fig. 10 a detail transverse sectional view of a portion of the clutch body, the clutch ring and the ring expanding levers;

Fig. 11 a detail plan view of the ring expanding levers showing the ring in its normal or contracted position;

Fig. 12 a view similar to Fig. 11 showing the levers moved to expand the ring;

Fig. 13 a detail perspective view of one of the ring expanding levers and its expanding cam;

Fig. 14 a longitudinal sectional view of a slightly modified form of the clutch;

Fig. 15 a detail transverse sectional view of a portion of the clutch shown in Fig. 14 showing means for adjusting the ring expanding cams to take up for wear in the clutch members;

Fig. 16. a detail sectional view of the adjusting means shown in Figs. 14 and 15;

Fig. 17 a detail plan view of the cam adjusting means shown in Fig. 16; and

Fig. 18 a detail perspective view of the two adjustable cam blocks shown in Figs. 16 and 17.

Referring to the various parts by numerals, 1 designates a drive shaft. On this shaft is rigidly secured a clutch body 2 by means of a key 3 rigidly connected to the shaft and fitting a key-way 4 formed in the clutch body. The key-way 4 is open at the inner end of the clutch body so that the clutch body may be slid in over the key and then rigidly secured in position by a set screw 4ª tapped through the clutch body and bearing on the drive shaft. The clutch body is formed of a sleeve portion 5, the inner portion of which is slightly larger in diameter than the outer portion thereof to form a stop shoulder 6. The inner end of the clutch body is provided with a radial circular flange 7 which carries at its outer end a drum 8 adapted to carry the clutch ring. The annular wall of the drum is interrupted to form an opening 9 and said drum extends from the supporting flange 7 toward the body part of the clutch so that it substantially encloses a considerable part of the large inner end of the clutch body, as shown clearly in Figs. 1 and 2. A portion of the outer surface of the clutch body, substantially coincident with the opening 9 is cut away to form a flat surface 13, as shown clearly in Fig. 4, to receive the clutch levers. The clutch ring drum, at a point diametrically opposite the opening 9 is formed with a key-way 10 which extends longitudinally across the face of the drum and is adapted to receive a key 11 formed on the clutch ring 12. The clutch ring is split or divided and the opening between the ends of said ring is co-incident with the opening 9 and diametrically opposite the key 11.

A pair of clutch levers 14 are mounted on the flat surface 13, the inner ends of said levers being formed with substantially spherical bearing lugs 15 which fit in sockets formed in the clutch body. The sockets in which these bearing lugs fit and work are preferably lined with suitable bushings or sleeves 16. Each clutch lever at its inner end is formed with an outwardly extending post 17, said posts being axially in line with the bearing lugs 15. The posts are parallel and extend outwardly through the opening 9 in the drum 8. The outer end of each post carries an expanding cam 18 which engage the ends of the clutch ring. The ring engaging portion of each cam is semi-circular in plan view and is beveled or inclined so that the area of its outer surface is somewhat smaller than the area of its inner surface. These semi-circular beveled portions of the ring expanding cams are adapted to fit correspondingly shaped and under cut recesses in the ends of the clutch ring, as clearly shown in Figs. 10, 11 and 12. The expanding cams contact with each other in their normal and extended positions along two angularly disposed faces 19 and 20. The faces 19 abut together when the clutch levers are in their normal position and the clutch ring is contracted, as shown in Fig. 11; and the faces 20 abut together, or substantially so when the clutch levers are moved outwardly, that is to say away from each other, and the clutch ring is expanded, as shown clearly in Fig. 12. The faces 19 are longer than the faces 20 and when the levers are in their normal position said faces extend slightly beyond a line passing through the centers of the pivots of the levers. As the levers are moved outwardly away from each other the cams are forced outwardly until the points where the faces 20 meet the ends of the faces 19 are directly in line between the pivots of the levers. This action is substantially that of a toggle joint and brings about the expansion of the clutch ring. The free ends of the clutch levers are beveled as at 21 to receive the end of the wedge block carried by the shifter sleeve.

Slidably mounted on the reduced outer end portion of the clutch body is a shifter sleeve 22, said sleeve being provided with an external annular channel 23 to receive a shifter lever. To the inner side of the shifter sleeve is rigidly connected a tapered shoe or wedge block 24, the point of which extends inwardly and is adapted to engage the tapered or beveled ends of the clutch levers. The wedge block slides on the flattened surface 13 of the clutch body and between longitudinally extending guide ways 25 formed at the outer end of the clutch body. These guide ways and the wedge block connect the shifter sleeve to the clutch body, and through said body to the drive shaft so as to turn therewith while it is slidable thereon. A stop block 26 is secured to the clutch body and closes the outer end of the channel between the guide ways 25 to permanently lock the shifter sleeve to the clutch body and to form a stop for the shifter sleeve in its outer or clutch releasing position. The shoulder 6 forms a stop to limit the inward movement of the shifter sleeve, that is to say, its clutch applying position, and the guide ways 25 are of sufficient length to engage the wedge block at all times. The wedge block, at diametrically opposite points, is formed with recesses 27 to receive the cam ends 28 of the clutch levers when the wedge-block is thrust to the limit of its clutch applying motion as clearly shown in Fig. 12, and thereby lock the wedge block and the clutch levers in applied position. The interior of the shifter sleeve, on opposite sides of the wedge block, is cut out to form recesses 29 to receive the ends of the clutch levers.

The driven member of the clutch comprises a sleeve 30 loosely mounted on the drive shaft and held in its proper relation to the clutch body, or driving member, by a rigid collar 31 secured to the drive shaft. The sleeve 30 is designed to carry a pulley or any other means for transmitting power. The inner end of the sleeve 30, that is to say, the end adjacent the clutch body, is formed with a circular radial flange or web 32 on the outer end of which is formed a cylindrical clutch member 33 which encloses the clutch ring. The end of this cylindrical clutch member toward the shifter sleeve is closed by a circular flanged guard plate 34. This plate is rigidly secured to the clutch member 33 and turns therewith and completes the housing for the clutch ring and clutch ring drum and the operating elements therein. The housing 34 is formed with a central aperture 35 into which slides the cylindrical enlargement 36 formed on the shifter sleeve. The opening 35 is just large enough to receive the enlargement 36 of the shifter sleeve and the said enlargement forms a guard and dust ring in both its inner and outer positions. By this means the entire clutch mechanism is enclosed and guarded and protected from dust and dirt.

Within the clutch member 33 of the driven member is arranged a wearing ring 37, the outer surface of which bears directly against the inner surface of the clutch member 33. The inner surface of the wearing ring 37 and the outer surface of the clutch ring are oppositely beveled; and the clutch ring is adjustably connected to the web 32 by means of four bolts 38, said bolts being connected to the smaller tapered edge of the ring. By adjusting these bolts the wearing ring may be drawn toward the web 32 and thereby take up any wear between the clutch members. The heads of the bolts 38 are provided with index characters in order to permit all of said bolts to be turned a determined and definite amount in order to accurately adjust the wearing ring.

It has been found in the use of clutches of the expansion ring type of considerable diameter that the speed of rotation tends to throw the ends of the clutch ring outwardly, that is to say tends to expand the clutch ring. To overcome this tendency inwardly extending lug pins 39 are secured to the ends of the clutch ring. The clutch ring is provided near each of its ends with an aperture through which one of the locking pins extends. The pins are formed with heads at their outer ends which fit in enlarged sockets formed in the ring, said heads limiting the inward movement of the pins. The inner end of each pin is formed with an annular channel 40 and with an inner head 41. Formed on the inner side of the web 7 of the clutch body is an annular rib-like bearing surface 42. Pivoted on this bearing surface adjacent the inner ends of the locking pins 39 are two weighted locking pawls 43. These locking pawls, adjacent their pivots, are formed with lugs 44 which fit in the channels 40 and engage the heads 41 of the locking pins. Each of the pawls 43 is yieldingly held in its normal locking position by a spring 45, one end of which is secured to the pivot of the pawl, the other end engaging the inner surface of the pawl at a suitable distance from its pivot. These springs merely serve to hold the pawls in locking engagement with the heads 41 of the locking pins and are not sufficiently strong to exert any inward pull on the locking pins. The locking pawls are of considerable weight and are so proportioned that the speed of rotation of the clutch will tend to throw them outwardly and thereby cause the lugs 44 to press inwardly on the heads of the locking pins. This pressure is designed to be just sufficient to overcome the tendency of the clutch ring to expand due to the centrifugal force of the rotating parts. By means of this arrangement the clutch ring when released, that is to say when the clutch is released, will be in a substantially floating condition with no tendency to bind through centrifugal action.

In Figs. 14 to 18 inclusive the wearing ring 37 is omitted and the clutch ring directly engages the inner surface of the driven clutch member. In this construction the adjustable means for taking up for wear in the clutch elements or members is applied directly to the cam heads carried by the clutch levers. As shown in these figures the adjacent faces of the two cams are cut away to provide a substantial clearance between the two cams. The adjacent faces of the two cams are cut out to form channels 46 whose inner walls 47 incline from the outer surfaces of the cams toward the center of the clutch body and toward each other. In each of these channels is fitted a correspondingly tapered wedge block 48, the larger end of said wedge block extending slightly beyond the edge of the cam in which it is mounted. In one of the cams is mounted a screw 49 which carries near its outer end a freely rotatable washer or collar 50. The adjacent wedge block 48 is slotted at 53 near its outer end to receive the washer 50 so that by screwing the screw 49 into or out of the cam head the connected block 48 will be correspondingly moved on the inclined surface 47. The wedge-block connected to the washer 50 is provided with a lateral pin 51 having an approximately spherical head 52 fitted in an angular recess 54 formed in the adjoining face of the opposite wedge block. By this means the two wedge blocks are connected together to move up and down through the adjustment of the screw 49. The wedge blocks engage each other between the cam heads and said blocks are formed with surfaces 19ª and 20ª angularly arranged with respect to each other and corresponding with the surfaces 19 and 20 of the cams illustrated in Figs. 11 and 12, and for the same purposes. It is manifest that by screwing the screw 49 into the cam head the wedge blocks will be forced toward the center of the clutch body and force the cams away from each other and consequently take up for any wear in the cams or in the clutch members. The washer or collar 50 is adapted to fit and move up and down in a socket 55 formed in the cam head.

In the modified form of clutch illustrated in Figs. 14 to 18 it will be observed that the coacting friction surfaces of the split ring and driven clutch member are not conoidal as in the construction shown in the other views. It will also be observed that in this modified construction the split ring is closely confined between the integral end wall of the cylindrical driven member and the detachable end wall or guard plate held to the opposite end of said cylindrical driven member, said two walls being preferably thickened opposite the side edges of the ring (as shown in Fig. 14) to provide internal annular ribs against which the side edges of the ring are adapted to abut to resist any substantial lateral movement of the ring in either direction.

When the shifter sleeve is moved inwardly to swing the clutch levers on their pivots the operation of the cam heads will be to swing the outer ends of the posts outwardly or away from each other. This will cause a slight rocking of the levers, and to permit this movement the levers are beveled slightly on their under sides as illustrated in Figs.

10 and 15. The bearing lugs 15 will be of sufficient strength to resist any shearing strain brought thereon through the operation of the wedge block.

From the foregoing it is manifest that I provide a friction clutch wherein the clutch body may be of comparatively small diameter while the clutch ring may be of any desired diameter. It is only necessary to make the clutch ring drum as large as desired and to then make the co-acting and enclosing driven clutch member to correspond in size with the clutch ring drum. The clutch operating levers are mounted on the clutch body and it is only necessary to make the posts on said levers long enough to bring the cam heads between the ends of the clutch ring on the outer side of the clutch ring drum.

What I claim is:

1. A friction clutch comprising a sleeve-like clutch body adapted to be fixed on a drive shaft and formed with a clutch-ring drum adjacent one end, a split expansible clutch-ring surrounding the periphery of the drum and held to said drum to rotate therewith, a pair of levers extending longitudinally of the clutch body into the drum, means pivotally holding said levers at one end to the body at points within the drum to swing toward and from each other, a pair of posts each carried by one of said levers at its pivoted end, said posts extending through the annular wall of the drum and having cam heads at their outer ends interposed between the ends of the split clutch-ring, said heads rockably engaging each other, means forming a pivotal connection between each cam head and the adjacent end of the clutch-ring for permitting the heads to rotate relatively to the ring with said posts and exert a spreading pressure against the ends of the ring when the free ends of the levers are spread apart, a shifter sleeve mounted on the clutch body at one side of said drum to slide longitudinally on said body and rotate with the body, a wedge member held to the shifter sleeve adapted to engage between the free ends of the levers to spread the same apart, and a driven clutch member having an internal friction surface surrounding the split ring.

2. A friction clutch comprising a driven clutch member having an internal friction surface, a clutch body adapted to be fixed on a drive shaft, a drum carried by said body within the driven clutch member, a split expansible clutch-ring mounted on the periphery of said drum to rotate therewith within the driven clutch member and having an external friction surface, a pair of cam members interposed between the ends of the clutch ring and rockably engaging each other, a pair of posts supporting said cam members at their outer ends and extending inwardly through the drum side by side, a pair of levers connected at one end with the inner ends of said posts within said drum and extending transversely of the drum and ring side by side, means pivotally connecting said levers with the clutch body at their post-carrying ends to swing about axes extending longitudinally of the posts, and lever-spreading means mounted on the clutch body to rotate therewith and shift thereon toward and from the drum, said lever-spreading means being adapted to engage between the free ends of the levers and spread the same apart when shifted on the clutch body in one direction.

3. A friction clutch comprising a sleeve-like clutch body adapted to be fixed on a drive shaft and formed at one end with a clutch-ring drum having an opening in the annular wall thereof, a split expansible clutch-ring mounted on the outer side of the annular wall of the drum having an external friction surface and held to the drum to rotate therewith, a driven clutch member arranged on the drum-carrying end of the clutch body and having an internal friction surface surrounding the ring, a pair of levers extending longitudinally of the clutch body side by side into the drum, a pair of posts connected at their inner ends with the ends of the levers within the drum and extending outwardly side by side through the opening in the annular ring-supporting wall of the drum, a pair of cam members carried by the outer ends of the posts and rigidly held thereto between the ends of the split ring, said cam members rockably engaging each other and each being pivotally engaged with one end of the split ring to rock about an axis extending longitudinally of its supporting post, means forming a ball-and-socket pivotal and universal tilting connection between each lever and the clutch body at the post-carrying end of the lever, a shifting member mounted on the clutch body at one side of said drum to rotate with the body and slide longitudinally of the body, and means carried by said shifting member adapted to engage between the free ends of the levers and spread the same apart when said member is shifted in one direction longitudinally of the body.

4. A friction clutch comprising a sleeve-like clutch body adapted to be fixed on a drive shaft and formed at one end with a clutch-ring drum having an opening in the annular wall thereof, a split expansible clutch-ring mounted on the outer side of the annular wall of the drum having an external friction surface and held to the drum to rotate therewith, a driven clutch member arranged at the drum-carrying end of the clutch body and having an internal friction surface surrounding the ring, a pair of levers extending longitudinally of the clutch body side by side into the drum, a pair of posts connected at their inner ends with the ends of the levers within the drum and extending outwardly side by side through the opening in the annular ring-supporting wall of the drum, a pair of cam members carried by the outer ends of the posts and rigidly held thereto between the ends of the split ring, said cam members rockably engaging each other and each being pivotally engaged with one end of the split ring to rock about an axis extending longitudinally of its supporting post, means forming a ball-and-socket pivotal and universal tilting connection between each lever and the clutch body at the post-carrying end of the lever, a shifting member mounted on the clutch body at one side of said drum to rotate with the body and slide longitudinally of the body, means carried by said shifting member adapted to engage between the free ends of the levers and spread the same apart when said member is shifted in one direction longitudinally of the body, and means on the driven clutch member cooperating with opposite side edges of the split ring for resisting lateral movements of the ring in either direction.

5. A friction clutch comprising a sleeve-like clutch body adapted to be fixed on a drive shaft and formed with a clutch-ring drum adjacent one end, a split expansible clutch-ring surrounding the periphery of the drum and held to said drum to rotate therewith, a pair of levers extending longitudinally of the clutch body into the drum, means pivotally holding said levers at one end to the body at points within the drum to swing toward and from each other, a pair of posts each carried by one of said levers at its pivoted end, said posts extending through the annular wall of the drum and having cam heads at their outer ends interposed between the ends of the split clutch-ring, said heads rockably engaging each other, means forming a pivotal connection between each cam head and the adjacent end of the clutch-ring for permitting the heads to rotate relatively to the ring with said posts and exert a spreading pressure against the ends of the ring when the free ends of the levers are spread apart, a shifter sleeve mounted on the clutch body at one side of said drum to slide longitudinally on said body and rotate with the body, a wedge member held to the shifter sleeve adapted to engage between the free ends of the levers to spread the same apart, a driven clutch member having an internal friction surface surrounding the split ring, weighted means pivotally supported within the drum to swing outwardly under the influence of centrifugal force, and means extending through the annular wall of the drum and connecting said weighted means with the split ring near the ends of the ring for exerting an inward pull on the end portions of the ring when said weighted means swings outwardly.

6. A friction clutch comprising a sleeve-like clutch body adapted to be rigidly secured to a drive shaft and carrying a clutch ring drum at its inner end said drum having an opening in the outer cylindrical wall thereof, a split clutch ring mounted on said drum, a pair of clutch levers mounted on the clutch body, their inner ends extending within the drum, means for pivotally connecting said levers at their inner ends to the clutch body, a post carried by each of said levers at its inner end said posts extending outwardly through the opening in the drum, cam heads carried at the outer ends of said posts said cam heads engaging each other and the ends of the clutch ring, a driven clutch member surrounding and enclosing the said drum and the clutch ring and being adapted to be engaged by the clutch ring when said ring is expanded, a shifter sleeve mounted on the clutch body and formed with a sleeve-like enlargement adapted to enter the driven clutch member and serve as a guard, and a wedge block carried by said shifter sleeve and adapted to engage the free outer ends of the clutch levers to expand the clutch ring.

7. A friction clutch comprising a clutch body adapted to be fixed on a drive shaft and carrying a clutch-ring drum, a split expansible clutch ring mounted on the periphery of the drum and held to the drum to rotate therewith, a pair of levers extending side by side transversely of the drum from points within the drum, a pair of posts carried by said levers at one end of the levers and extending outwardly through the annular wall of the drum side by side, means pivotally and tiltably holding the levers to the clutch body at their post-carrying ends, cams carried by the outer ends of the posts rockably engaging each other and each journalled in one end of the clutch ring to rotate about an axis extending longitudinally of its carrying post, a shifter sleeve mounted on the clutch body to rotate therewith and slide toward and from the drum, means carried by said sleeve adapted to engage between the free ends of the levers and spread the same apart to expand the split ring, a driven clutch member having a friction surface surrounding the ring, and adjustable means for tilting said levers and posts on their pivots without breaking the rocking contact between the cams to compensate for wear of the engaging faces of the ring and the driven clutch member.

8. A friction clutch comprising a clutch body adapted to be rigidly secured to a drive shaft and carrying a clutch ring drum, a split expansion clutch ring mounted on said drum, a pair of clutch levers mounted on the clutch body, means for pivotally connecting said levers to the clutch body, a post carried by each of said levers and extending outwardly through the drum and carrying cam heads at their outer ends adapted to engage the ends of the clutch ring, a shifter sleeve mounted on the clutch body, means carried by said shifter sleeve and adapted to engage the clutch levers to expand the clutch ring, a driven clutch member adapted to be engaged by the clutch ring, and means operable by the centrifugal force due to the rotation of the clutch and acting to prevent the expansion of the clutch ring through the action of centrifugal force.

9. A friction clutch comprising a clutch body adapted to be rigidly secured to a drive shaft, a split expansible clutch-ring held to the clutch body to rotate therewith, a pair of levers each pivotally held at one end to the clutch body within the ring and extending transversely of the ring side by side, a pair of cams rockably engaging each other and interposed between the ends of the ring and rigidly connected with the levers, an operating device mounted on the clutch body to rotate therewith and shift relatively thereto transversely of the ring and adapted to engage between the free ends of the levers to spread the same apart and expand the ring, a driven clutch member adapted to be engaged by the ring when said ring is expanded, a pair of weighted members pivotally held to the clutch body independently of said levers to swing toward and from the axis of rotation of said body, and pull connections between said weighted members and the ring tending to contract the ring upon outward swinging of said members under the influence of centrifugal force.

10. A friction clutch comprising a clutch body adapted to be rigidly secured to a drive shaft, a split expansion clutch ring, a slidable device mounted on the clutch body, means adapted to be operated by said slidable device to expand the clutch ring, a driven clutch member adapted to be engaged by the clutch ring, a pair of pivoted weighted pawls within the clutch body, an inwardly extending headed locking pin carried by each end of the split clutch ring, and a lug carried by each of the said weighted pawls and adapted to engage the headed end of an adjacent locking pin.

11. A friction clutch comprising a clutch body adapted to be rigidly secured to a drive shaft, a split expansion clutch ring, a slidable device mounted on the clutch body, means adapted to be operated by said slidable device to expand the clutch ring, a driven clutch member adapted to be engaged by the clutch ring, two movable members mounted within the clutch body and adapted to swing outwardly away from the center of said clutch body, and means yieldably connecting said weighted members to the ends of the clutch ring.

In testimony whereof I hereunto affix my signature.

JOSEPH H. ROBERTS.